United States Patent
Bruner et al.

(10) Patent No.: US 7,290,184 B2
(45) Date of Patent: Oct. 30, 2007

(54) EMULATION SYSTEM FOR EVALUATING DIGITAL DATA CHANNEL CONFIGURATIONS

(75) Inventors: Nikki M. Bruner, Oklahoma City, OK (US); John E. Young, Norman, OK (US)

(73) Assignee: Seagate Technology LLC, Scotts Valley, CA (US)

(*) Notice: Subject to any disclaimer, the term of this patent is extended or adjusted under 35 U.S.C. 154(b) by 487 days.

(21) Appl. No.: 10/087,130

(22) Filed: Feb. 28, 2002

(65) Prior Publication Data

US 2003/0041298 A1 Feb. 27, 2003

Related U.S. Application Data

(60) Provisional application No. 60/314,355, filed on Aug. 23, 2001.

(51) Int. Cl.
G06F 11/00 (2006.01)
G11C 29/00 (2006.01)
(52) U.S. Cl. ............... 714/704; 714/769; 714/770
(58) Field of Classification Search ........... 714/704, 714/769, 770, 741; 703/23
See application file for complete search history.

(56) References Cited

U.S. PATENT DOCUMENTS

| | | | | |
|---|---|---|---|---|
| 3,665,394 A | * | 5/1972 | Lender et al. | 714/819 |
| 3,689,899 A | * | 9/1972 | Franaszek | 341/59 |
| 4,566,100 A | | 1/1986 | Mizuno et al. | |
| 4,701,923 A | * | 10/1987 | Fukasawa et al. | 714/774 |
| 4,804,959 A | * | 2/1989 | Makansi et al. | 341/59 |
| 5,036,515 A | | 7/1991 | Freeburg | |
| 5,051,998 A | | 9/1991 | Murai et al. | |
| 5,068,858 A | * | 11/1991 | Blaum et al. | 714/774 |
| 5,163,051 A | | 11/1992 | Biessman et al. | |
| 5,220,569 A | | 6/1993 | Hartness | |
| 5,325,367 A | | 6/1994 | Dekker et al. | |
| 5,418,789 A | | 5/1995 | Gersbach et al. | |
| 5,422,761 A | * | 6/1995 | Anderson et al. | 360/47 |
| 5,530,705 A | | 6/1996 | Malone, Sr. | |
| 5,581,577 A | * | 12/1996 | Abe | 375/225 |
| 5,627,843 A | | 5/1997 | Deng et al. | |
| 5,687,182 A | * | 11/1997 | Shikakura | 714/774 |
| 5,995,305 A | * | 11/1999 | McNeil et al. | 360/31 |
| 6,009,549 A | * | 12/1999 | Bliss et al. | 714/769 |
| 6,023,384 A | * | 2/2000 | Anderson et al. | 360/48 |
| 6,043,946 A | | 3/2000 | Genheimer et al. | |
| 6,046,874 A | * | 4/2000 | Takahashi | 360/65 |
| 6,115,198 A | * | 9/2000 | Reed et al. | 360/46 |
| 6,182,264 B1 | * | 1/2001 | Ott | 714/774 |
| 6,405,342 B1 | * | 6/2002 | Lee | 714/792 |
| 6,442,730 B1 | * | 8/2002 | Schachner et al. | 714/795 |
| 6,505,320 B1 | * | 1/2003 | Turk et al. | 714/755 |
| 6,957,379 B1 | * | 10/2005 | Patapoutian et al. | 714/774 |

* cited by examiner

*Primary Examiner*—Joseph D Torres
(74) *Attorney, Agent, or Firm*—Fellers, Snider, et al.

(57) ABSTRACT

Method and apparatus for evaluating different digital data channel configurations. A digital data channel stores input data to a recordable medium and retrieves readback data from the medium. The input data are arranged into an input sequence of symbols of selected symbol length, and the readback data are arranged into an output sequence of symbols of the selected symbol length. Comparing the output sequence to the input sequence allows identification of the number of erroneous symbols for the selected symbol length. Different input and output sequences are generated using different symbol lengths from the same input and output data. In this way, error rate performance can be predicted for different error correction code (ECC) and run length limited (RLL) encoding scheme combinations. The steps are carried out by an emulation system preferably comprising a field programmable gate array (FPGA) which inhibits and emulates selected portions of the digital data channel.

12 Claims, 7 Drawing Sheets

EMULATION SYSTEM FOR EVALUATING DIGITAL DATA CHANNEL CONFIGURATIONS

RELATED APPLICATIONS

This application claims priority to U.S. Provisional Application No. 60/314,355 filed Aug. 23, 2001.

FIELD OF THE INVENTION

The claimed invention relates generally to the field of digital data communication systems and more particularly, but not by way of limitation, to a channel emulation system which facilitates characterization of error rate performance of a disc drive data storage device having various alternative digital data channel configurations including the use of different run length limited (RLL) and error correction code (ECC) encoding schemes.

BACKGROUND

Data storage devices of the type known as Winchester disc drives are well known in the art. Such disc drives magnetically record digital data on one or more rigid recording discs that are rotated at a constant, high speed. An array of data transducing heads access data tracks defined on the various disc surfaces to write data to and read data from the discs.

An actuator is used to controllably position the heads adjacent the discs through the use of a voice coil motor (VCM). A servo circuit uses prerecorded servo positioning data to provide closed loop head positioning. A digital data channel controls the writing of input data to data sectors defined on the discs and the subsequent recovery of the input data from the discs.

With the continued trend of achieving ever higher areal data recording densities on the discs, it is important for disc drive designers to be able to accurately characterize error rate performance of various data channel configurations in order to select a final configuration for a disc drive product that achieves the requisite performance characteristics. Disc drive designers often use a measure referred to as raw bit error rate (RBER) to characterize channel performance.

RBER is defined as a ratio of the number of erroneous bits out of a total number of bits read. It has generally been accepted historically that a smaller RBER generally correlates to better drive performance, including a lower probability of outputting data to a host device containing undetected errors (probability of passing undetected erroneous data, or $P_{UED}$).

A limitation with this focus on RBER is that, with recent advancements in data processing technology, it has been discovered that a lower RBER does not necessarily correlate to improved performance. That is, other factors including error correction coding (ECC) schemes, run length limited (RLL) encoding schemes, and the interaction that can take place between these approaches can make RBER less than a valid predictor of overall drive performance. In fact, in some encoding schemes where redundant levels of encoding are also applied, RBER becomes a meaningless measure of system performance or at least inaccurate indicator of quality.

As will be recognized, ECC schemes allow the detection and correction of selected numbers of erroneous symbols in a data stream through the calculation of appropriate code words which are appended to the user data and recorded to the discs. Different powers of ECC can be employed based on different symbol lengths (i.e., number of consecutive bits in each symbol) and numbers of interleaves (i.e., groupings of the symbols in an order different from that in which the bits appear on the media). Exemplary symbol lengths can include 8 bits, 10 bits, 12 bits, 14 bits, etc.

RLL schemes and (and other constraint-based encoding schemes) are generally used to ensure that logical 1's (flux transitions) in the bit stream fall within certain bounds of occurrence. A typical RLL scheme specifies both the minimum and maximum number of logical 0's that can occur between consecutive logical 1's. RLL schemes involve a transformation of m bits into n bits. Exemplary RLL schemes include 8/9, 16/17, 32/34, 99/100, etc. The higher the values of m and n, the lower the overhead; for example, using 8/9 encoding means that 9 bits are written to the disc surface to represent 8 user data bits, so that 1/9 (11%) of the data bits are overhead (nondata). Using 99/100 encoding, by contrast, means that every 99 user data bits are represented on the media by 100 bits, so that only 1/100 (1%) constitutes overhead. While higher RLL ratios advantageously reduce overhead, higher RLL ratios also tend to provide reduced signal to noise levels, so that higher RBER rates can be observed with higher RLL schemes.

Added to the difficulty in predicting performance of a disc drive design includes the fact that different head and media combinations and channel circuitry from different suppliers can provide different drive performance for a given encoding scheme. Disc drive development cycles are now often measured in months, if not weeks, and it is often impractical to wait to obtain physical samples of new channel circuitry from a supplier before evaluation of such circuitry can take place to decide on a final configuration for a given product.

Data integrity is a major factor in drive development. An accurate measurement for unrecoverable error events allows the disc drive designer to optimize encoding schemes and EGG algorithms for the disc drive recording medium. There is therefore a significant need for improvements in the art to enable a disc drive designer to readily and accurately characterize different alternative configurations of a digital data channel, including the use of different RLL and ECC encoding schemes, symbol lengths and interleaves.

SUMMARY OF THE INVENTION

A method and apparatus are disclosed for evaluating different digital data channel configurations. In accordance with preferred embodiments, the apparatus comprises a digital data channel which stores input data to a recordable medium and subsequently retrieves readback data from the medium corresponding to the input data.

An emulation system (circuit) arranges the input data into an input sequence of multibit symbols each having a first selected symbol length and arranges the readback data into an output sequence of multibit symbols each having the first selected symbol length. The emulation circuit determines a number of erroneous symbols in the output sequence in relation to differences between the input sequence and the output sequence.

The number of erroneous symbols is preferably used to predict error rate performance of the digital data channel using a first error correction code (ECC) encoding methodology based on the first selected symbol length. The symbols in the input sequence and in the output sequence are preferably arranged into respective pluralities of interleaves appropriate for the first ECC encoding methodology.

As desired, different input and output sequences are generated using different symbol lengths from the same input and readback data. In this way, error rate performance can be predicted for different error correction code (ECC) and run length limited (RLL) encoding scheme combinations.

The emulation system preferably comprises a field programmable gate array (FPGA) which inhibits and emulates selected portions of the digital data channel. A memory (such as random access memory, RAM) is used to store the input data and the readback data.

The method preferably comprises steps including using a digital data channel to store input data to a recordable medium, said input data comprising an input stream of data bits and subsequently using the digital data channel to obtain readback data from the recordable medium, said readback data comprising an output stream of data bits corresponding to the input stream of data bits.

The input data are arranged into an input sequence of multibit symbols, each symbol having a first selected symbol length. The readback data are concurrently arranged into an output sequence of multibit symbols, each symbol having the first selected symbol length.

The output sequence is compared to the input sequence to determine a first number of erroneous symbols in the output sequence, which is used to predict error rate performance of the digital data channel using an error correction code (ECC) encoding methodology associated with the first selected symbol length.

The method further preferably comprises arranging the input data and the readback data into different input and output sequences using different symbol lengths from the same input and readback data. Knowing the error distances in the readback data with respect to the input data allows the unrecoverable errors to be determined. In this way, error rate performance can be predicted for different error correction code (ECC) and run length limited (RLL) encoding scheme combinations.

These and various other features and advantages which characterize the claimed invention will become apparent upon reading the following detailed description and upon reviewing the associated drawings.

DETAILED DESCRIPTION

Figure 1:
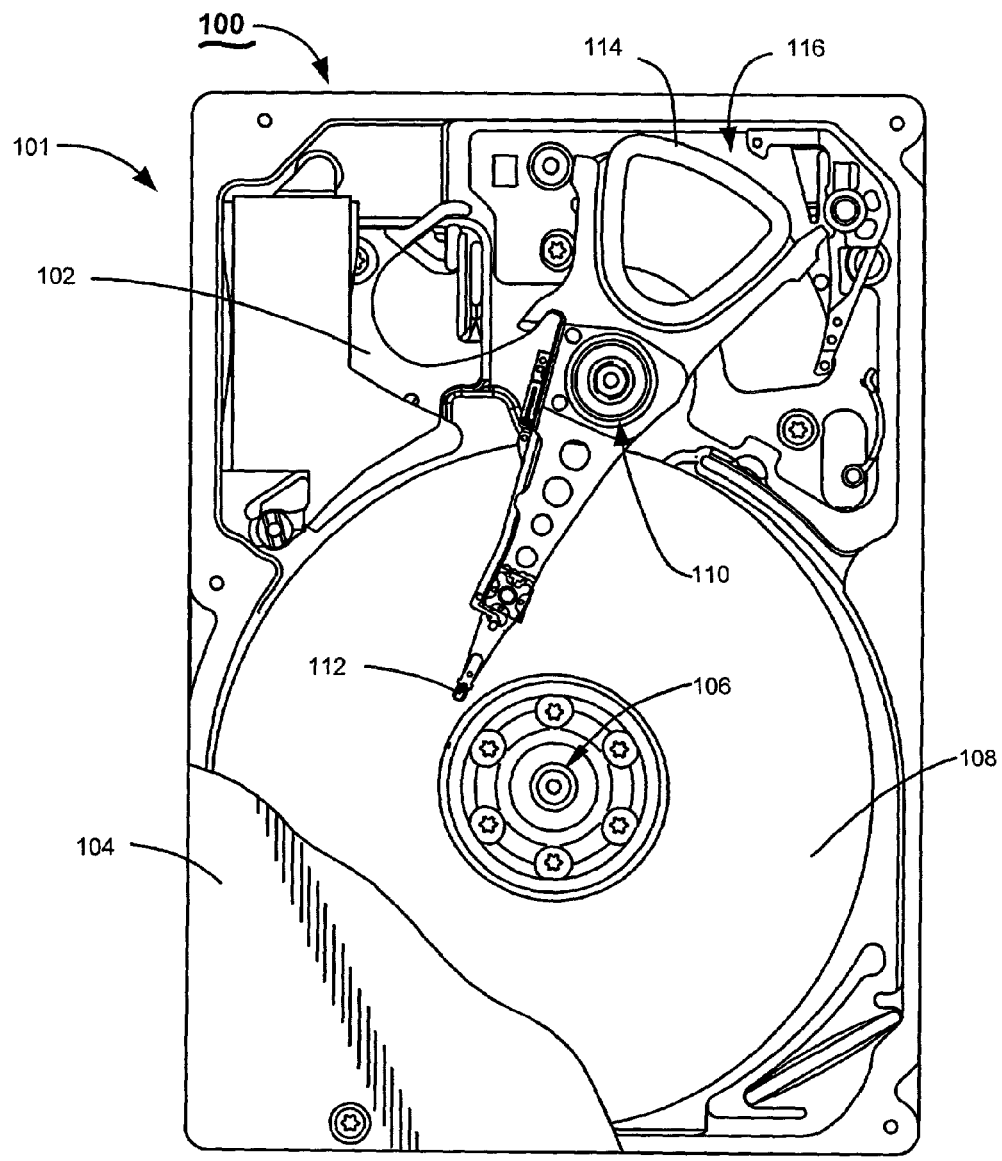
FIG. 1 is top plan view of a disc drive data storage device.

FIG. 1 provides a top plan view of a disc drive 100 constructed in accordance with preferred embodiments of the present invention. The disc drive 100 is composed of two main assemblies: a head-disc assembly (HDA) 101 housing mechanical portions of the disc drive 100, and a disc drive printed circuit board (PCB) which houses communication and control electronics for the drive. The PCB is mounted to the underside of the HDA 101 and is thus not visible in FIG. 1.

The HDA 101 includes a base deck 102 and a top cover 104 (shown in partial cutaway) which cooperate to form a sealed housing. A spindle motor 106 rotates a number of magnetic recording discs 108 at a constant, high speed.

An actuator 110 supports a number of data transducing heads 112 adjacent data recording surfaces of the discs 108. The actuator 110 is rotated about an actuator rotational axis through the application of current to an actuator coil 114 of a voice coil motor (VCM) 116.

Figure 2:
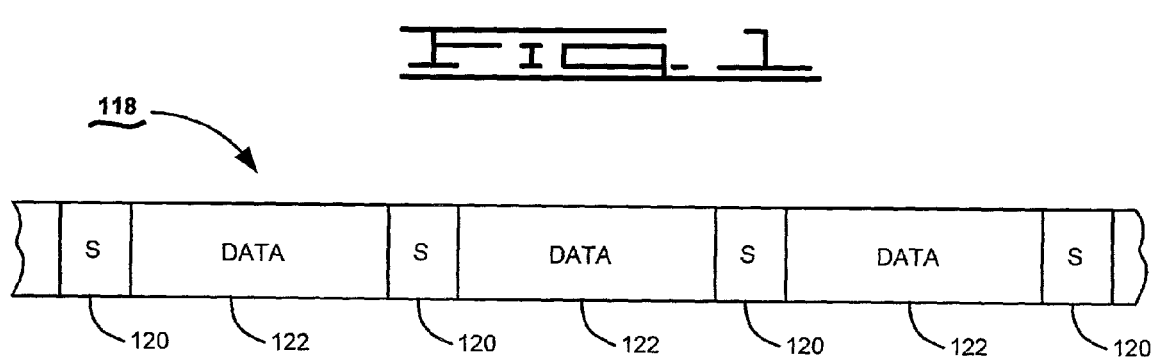
FIG. 2 generally illustrates the manner in which servo data and encoded user data are stored on tracks on the disc surfaces of the disc drive of FIG. 1.

The data recording surfaces are provided with a number of adjacent, concentric circular tracks, a portion one being shown at 118 in FIG. 2. Each track includes a number of angularly spaced servo data fields 120. The servo data fields store servo position data used by a servo control circuit (not shown) to maintain the heads 112 in a desired relationship to the tracks 118. The servo data fields 120 are preferably formed during a servo track writing operation during disc drive manufacturing.

Interspersed in the areas between the servo data fields 120 are user data fields, or data sectors 122. Each data sector is separately addressable by a host computer (not shown) and is configured to store a selected amount of encoded user data (such as 512 bytes).

Figure 3:
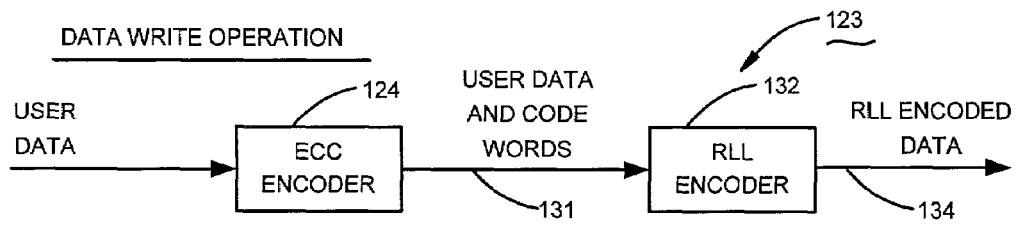
FIG. 3 is a general block diagram to illustrate one general methodology in which RLL and ECC encoding are applied to a set of input data during a write operation.
Figure 3:

FIG. 3 provides a generalized block diagram of a circuit 123 to illustrate a manner in which the disc drive 100 can be configured to write data to the user data fields 122. Input data from a host device are appended with Reed-Soloman error correction code (ECC) words by ECC block 124. The code words are selected for each portion of the input data so that the combination maps into a predefined mathematical construct. That is, the total set of symbols can be considered to be the coefficients of a polynomial having defined roots, so that only mathematically defined combinations can legally exist. During subsequent readback of the data, erroneous data symbols will not map into the set of defined combinations and can thus be individually identified. Depending upon the selected ECC algorithm, up to a selected number t of erroneous data symbols can be detected and a selected number of the erroneous data symbols can be corrected by the ECC code words.

Figure 4:
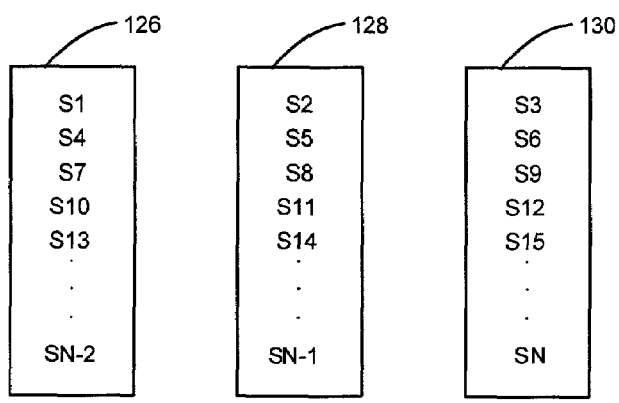
FIG. 4 illustrates how interleaves are formed from a number of symbols arranged from consecutive bits in the user data.
Figure 4:
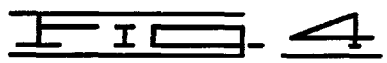

FIG. 4 shows the manner in which the data bits in the input user data are arranged for the application of ECC encoding by block 124. The user data bits are grouped as a consecutive sequence of symbols from S1 to SN of selected bit length. If a symbol length of 8 bits is used, then the first eight bits of the user data will compose symbol S1, the next 8 bits of user data will compose symbol S2 and so on. If a symbol length of 12 bits is used, then the first 12 bits of user data will compose symbol S1, the next 12 bits of user data will compose symbol S2, and so on.

The symbols are arranged into a number of interleaves such as shown at 126, 128 and 130. ECC code words are calculated for the symbols in each interleave. The interleaves 126, 128 and 130 advantageously reduce the effects of anomalous error events (such as thermal asperities) that corrupt a number of adjacent bits in the readback stream. For example, should an error event corrupt the retrieved bits of symbols S4, S5 and S6, the symbols can be corrected separately by each of the respective interleaves 126, 128 and 130. This eliminates the need for one set of ECC code words to try to correct all of the adjacent erroneous bits, and thus significantly enhances the error handling capabilities of the ECC scheme. The number of interleaves will depend on the power of ECC and the symbol length, so the use of three interleaves as shown in FIG. 4 is illustrative and not limiting.

Returning to FIG. 3, once the appropriate code words are selected by block 124, the user data bits and code words are provided via path 131 to an RLL encoder block 132. The RLL encoder block 132 applies run length limited (RLL) encoding to the data, resulting in RLL encoded data being output on path 134. The RLL encoded data are thereafter used to control the application of bi-directional write currents to write the data to a selected track 120.

As will be recognized, RLL encoding involves a transformation of m input bits into n encoded bits where m<n (and usually, n=m+1). Exemplary m/n RLL encoding schemes include 8/9, 20/21 and 99/100. RLL encoding is typically provided to meet specified constraints on the allowable minimum and maximum number of logical 0's between consecutive logical 1's in the bit stream. Such constraints are required since the periodic occurrence of logical 1's (flux transition pulses) in a readback signal are used as a control input to a phase locked oscillator (PLO) circuit used to time search windows for pulses in the retrieved bit stream; allowing too much elapsed time between consecutive pulses can cause the PLO to lose frequency lock on the readback signal.

By way of illustration, let it be assumed that the RLL encoder block 132 applies 8/9 encoding subject to a (0,7) constraint. This means that each consecutive eight bits in the user data and code words are transformed into a nine bit sequence having a minimum of no logical 0's between consecutive logical 1's and having a maximum of seven logical 0's between consecutive logical 1's.

Since there are a total of 256 different possible combinations of eight bit binary numbers ($2^8$=256) and a total of 512 different possible combinations of nine bit binary numbers ($2^9$=512), such encoding involves the selection of 256 of the possible 512 nine bit combinations that meet the (0,7) constraint. The selected values are organized into a lookup table or similar arrangement to facilitate on-the-fly transformation.

Figure 5:
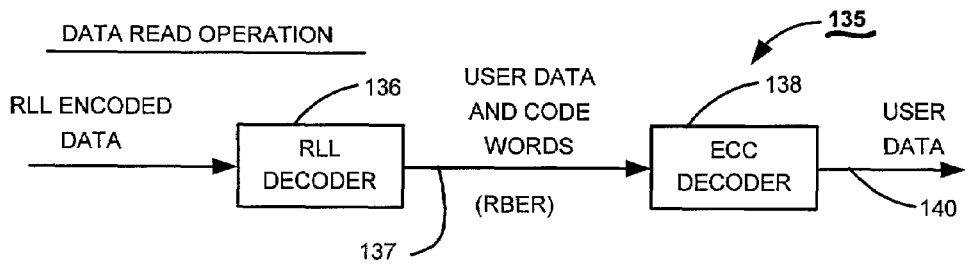
FIG. 5 is a general block diagram to illustrate how data written in accordance with the diagram of FIG. 3 are subsequently retrieved during a read operation.
Figure 5:
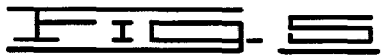

Referring now to FIG. 5, shown therein is a general block diagram of a readback circuit 135 useful in recovering the data encoded by FIG. 3. The RLL encoded data are transduced from the selected data fields 122 and subjected to an RLL decoder block 136. The decoder 136 performs the reverse process of RLL encoder block 132 (FIG. 3) so that each nine bit combination is transformed back to the original eight bits. The resulting user data and code words on path 137 are applied to an ECC decoder block 138 which arranges the bits into the appropriate symbols and interleaves (FIG. 4), and performs the necessary calculations using the code words to detect and correct any erroneous symbols. If successful, corrected user data identical to the original input user data (FIG. 3) are output on path 140 for use by the host device.

It will be noted that RLL encoding can provide some level of error detection in that subsequent receipt of a nine bit value by the RLL decoder 136 that does not map into the 256 selected combinations of nine bit values indicates the presence of at least one erroneous bit. Such an occurrence can be flagged as an erasure and provided to the ECC decoder 138 to help identify the erroneous symbol or symbols. Other erasure sources can be employed as recognized by those skilled in the art, such as upstream automatic gain control (AGC) circuitry used to normalize the data (e.g., the presence of a large increase in signal gain for example can serve as a thermal asperity erasure).

The ECC decoder 138 thus has the capability of correcting up to a maximum of t erroneous symbols or 2t erasures in each interleave. The value of t is user selected (a typical value is t=4 using Reed Solomon codes).

A raw bit error rate (RBER) for the configuration shown in FIGS. 3 and 5 can be calculated by comparing the bits on path 137 (FIG. 5) with the bits that were initially provided on path 131 (FIG. 3) in accordance with the following relationship:

$$RBER = \frac{B_{ERR}}{B_{TOTAL}} \quad (1)$$

where $B_{TOTAL}$ is the total number of bits read and $B_{ERR}$ is the number of erroneous bits (i.e., bits that are different on path 137 as compared to path 131). A preferred approach to calculating RBER involves temporarily storing the bits on path 131 in a first memory location during the operation of the circuit of FIG. 3, subsequently storing the bits on path 137 in a second memory location, and then performing a compare operation to identify the $B_{ERR}$ value. Historically, the RBER value has been used in part to estimate a probability of passing undetected erroneous data ($P_{UED}$) to the host device. For example, an RBER value of $1 \times 10^{-9}$ might be found to correspond to a $P_{UED}$ value of about $1 \times 10^{-32}$ (established, for example, by customer specifications).

A limitation associated with reliance on RBER values such as determined by equation (1) is that RBER generally does not take into account the capabilities or limitations of the ECC scheme in preventing undetected erroneous data from reaching the host device. Historically, there was a strong relationship between RBER and unrecoverable error rates; however, such relationship has steadily been undermined with newer encoding codes. The one to one relationship is no longer valid in more complex recording systems. Reliance upon RBER generally also fails to fully take into account further gains or loss in error detection and correction performance that can take place through the interaction between RLL and ECC (such as, for example, the ability to detect erasures as discussed above).

Figure 6:
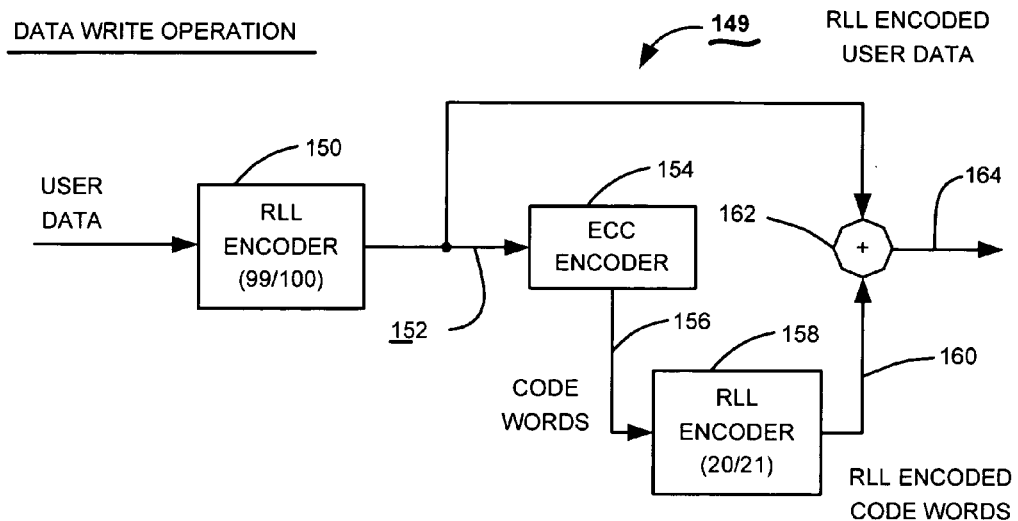
FIG. 6 is a general block diagram to illustrate another general methodology in which RLL and ECC encoding are applied to write a set of input data during a write operation.

To complicate matters, some recently proposed RLL/ECC encoding schemes do not facilitate the generation of a useful RBER value at all. For example, FIG. 6 provides an alternative circuit 149 that can be used by the disc drive 100 to encode input data. The input user data are provided to an RLL encoder block 150 which applies 99/100 RLL encoding to the user data. The resulting RLL encoded user data (on path 152) are supplied to an ECC encoder block 154 which arranges the data into a number of interleaves (such as in FIG. 4) and calculates appropriate code words.

The code words are output on path 156 to a second RLL encoder block 158 which applies 20/21 RLL encoding to the code words (only). The RLL encoded code words are output on path 160 to a summing junction 162 which appends the RLL encoded code words to the end of the RLL encoded user data and outputs the encoded combination on path 164 for writing to the discs 108.

This approach is generally more efficient than that of FIG. 3 since the user data are encoded with a higher RLL encoding scheme (100 bits on the media are used to represent 99 bits of user data, which results in an overhead of about 1% as compared to an overhead of about 11% using 8/9 encoding). However, since it has been observed that higher RLL encoding ratios tend to provide lower signal to noise ratios in the retrieved data, using a lower RLL scheme (in this case $^{20}\!/_{21}$) to encode the ECC code words helps assure that the ECC code words will be retrieved with a higher degree of accuracy.

Figure 7:
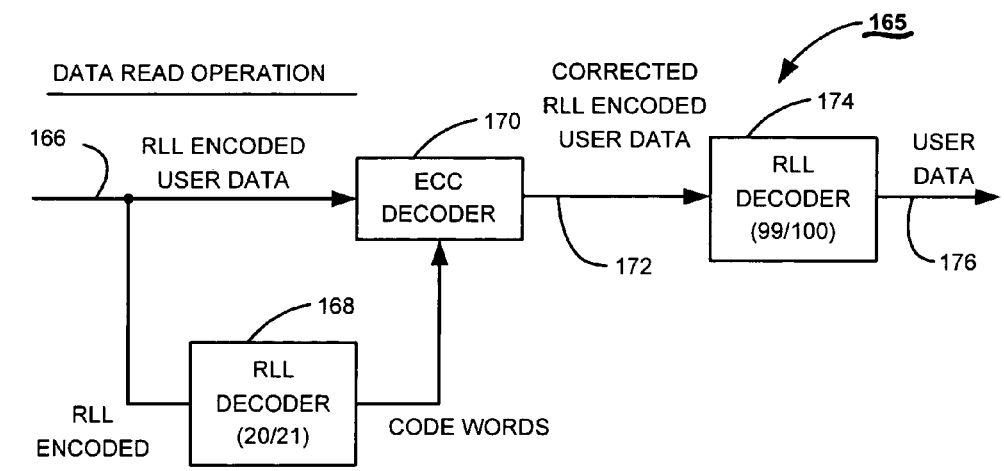
FIG. 7 is a general block diagram to illustrate how data written in accordance with the diagram of FIG. 6 are subsequently retrieved during a read operation.

FIG. 7 generally represents a readback circuit 165 used to recover the data encoded by FIG. 6. A retrieved bit stream on path 166 is separated into the RLL encoded user data and the RLL encoded code words, the latter of which are decoded by a {fraction ($^{20}\!/_{21}$)} RLL decoder block 168. The decoded code words are then used for ECC detection and correction of the RLL encoded user data by an EGG decoder 170. If successful, corrected RLL encoded user data are output on path 172 to a second RLL decoder block 174 which applies {fraction ($^{99}\!/_{100}$)} decoding to output the original user data on path 176.

It can be seen that there is no location within the circuit of FIG. 7 from which data can be taken to calculate a meaningful RBER in accordance with equation (1). Thus, it is difficult to quantify the extent to which the circuits of FIGS. 6 and 7 are preferable in terms of error rate performance as compared to the circuits of FIGS. 3 and 4. It is further difficult to evaluate the effects of different RLL and ECC encoding schemes that could be implemented in these respective channel configurations.

Figure 8:
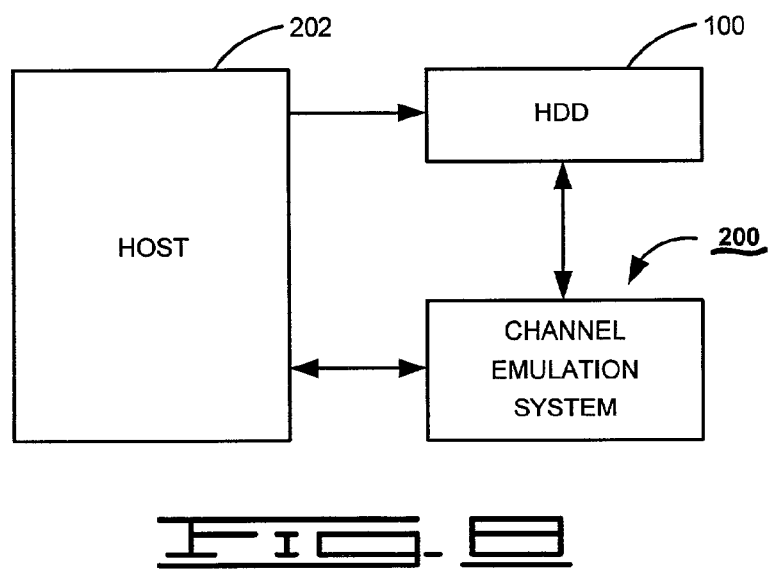
FIG. 8 provides a functional block diagram of the disc drive (hard disc drive, HDD) in conjunction with a host computer and a channel emulation system constructed and operated in accordance with preferred embodiments of the present invention.

Accordingly, FIG. 8 provides a top level functional block diagram of a channel emulation system 200 which can readily promote evaluation and comparison of these and other possible channel configurations for the disc drive 100, including evaluation of different RLL encoding schemes, ECC algorithms, symbol lengths and interleaves. The system 200 is shown in combination with the disc drive 100 (hard disc drive, or HDD) and a host computer 202 to generally illustrate a preferred connection methodology.

Figure 9:
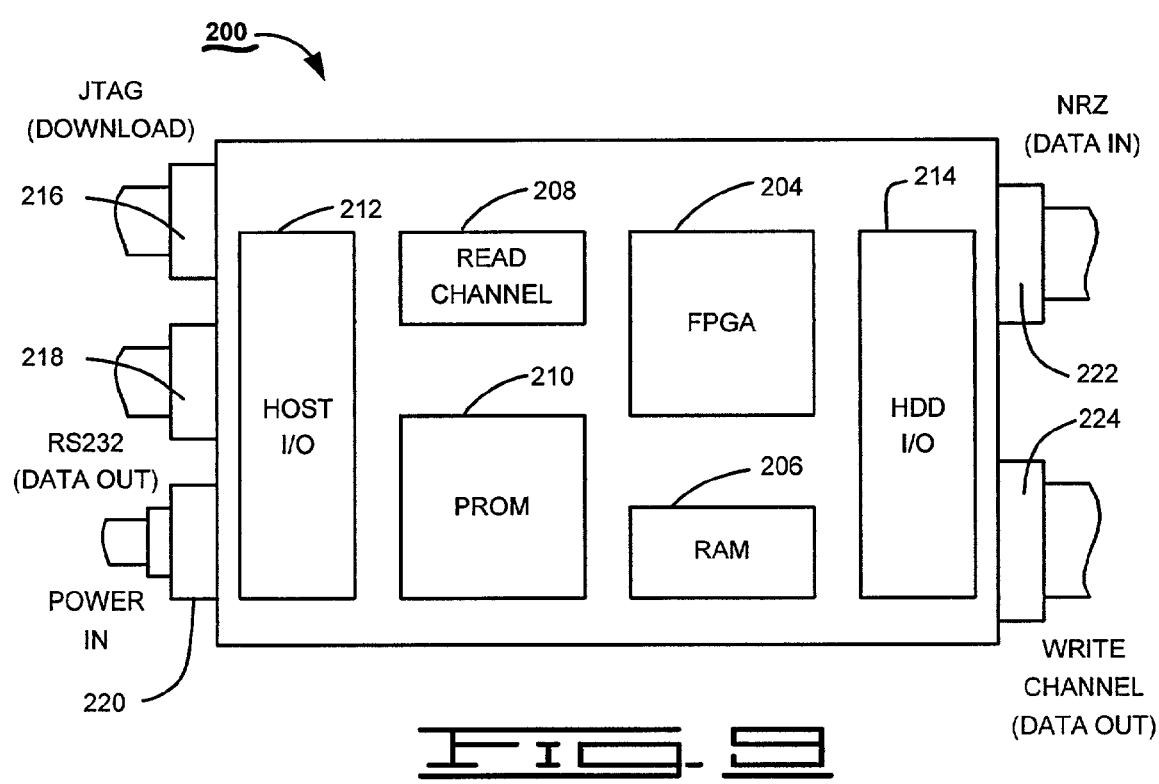
FIG. 9 generally depicts a preferred architecture of the channel emulation system of FIG. 8 as a daughter board mountable to a printed circuit board of the disc drive.

The system 200 is preferably embodied as a printed circuit board (PCB) as represented in FIG. 9. Various details have been omitted from FIG. 9 for purposes of clarity. Generally, the system 200 is shown in FIG. 9 to preferably comprise a field programmable gate array (FPGA) 204, random access memory (RAM) 206, an optional read channel integrated circuit (IC) 208, a programmable read-only memory (PROM) 210, host input/output interface circuitry 212 and HDD I/O interface circuitry 214. The system 200 preferably mounts as a daughter board to the disc drive PCB.

Connection paths with the system 200 are represented in FIG. 9 to include a download port (connector 216) used to receive updates from the host computer 202 preferably using Joint Tag Action Group (JTAG) protocol; a data out port (connector 218), preferably using RS-232 protocol; input power (connector 220); a data in port (connector 222), preferably comprising a non-return to zero (NRZ) line from the disc drive 100; and a write data out port (connector 224) comprising a multibit line connected to the disc drive 100 (as discussed below). Details concerning the preferred manner in which data are passed via these various ports will be discussed below.

Figure 10:
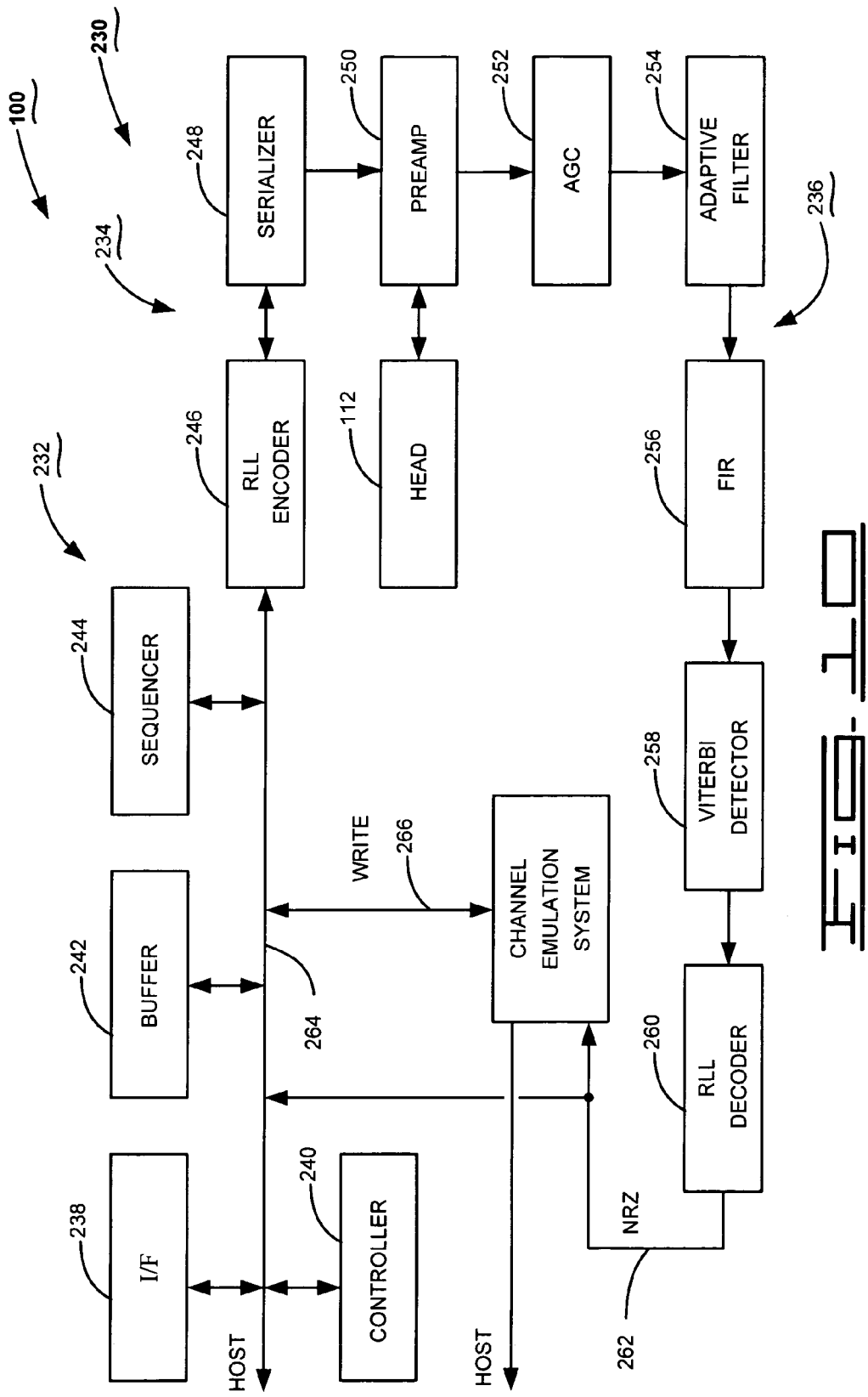
FIG. 10 is a functional block diagram of relevant portions of the digital data channel of the disc drive in conjunction with the channel emulation system of FIGS. 8 and 9.

Functional connection of the system 200 is shown in FIG. 10. Particularly, FIG. 10 shows the system 200 in conjunction with a digital data channel 230 of the disc drive 100. The data channel 230 includes a number of conventional components familiar to those skilled in the art and includes a hardware/firmware based interface circuit (generally denoted at 232), a write channel (generally denoted at 234) and a read channel (generally denoted at 236).

The interface circuit 232 controls the flow of data between the discs 108 and the host computer 202 and generally includes host interface hardware 238, a programmable controller (microprocessor) 240, a data buffer 242 and a sequencer 244.

The write channel 234 generally operates to write input user data to the discs 108 and generally includes an RLL encoder 246, a serializer 248 and write driver portions of a preamplifier/driver circuit (preamp) 250.

The read channel 236 generally operates to retrieve previously written data from the discs 108 and includes preamplifier portions of the preamp 250, an automatic gain control (AGC) circuit 252, an adaptive low-pass filter 254, an analog, equalizing time-domain finite impulse response (FIR) filter 256, a sampling and digitizing Viterbi detector 258 and an RLL decoder 260. Those skilled in the art will recognize the channel as performing partial response, maximum likelihood (PRML) detection, although such is not limiting.

NRZ data from the RLL decoder are provided on path 262 and this path connects to a disc drive interface bus 264 as well as to the NRZ data-in connector 222 of FIG. 9. Likewise, write channel data-out path 266 (from connector 224 in FIG. 9) connects to the interface bus 264.

During normal disc drive operation, the interface controller 240 is preferably configured to normally apply ECC encoding upon input data provided to the buffer 242, and to subsequently perform ECC decoding upon data retrieved by the read channel 236 and placed into the buffer 242. However, during channel evaluation operations the system 200 is preferably configured to disable and emulate (replace) any and all selected digital processing functions of the interface circuit 232, write channel 234 and read channel 236. Such emulation primarily takes place within the high speed hardware of the FPGA 204.

Figure 11:
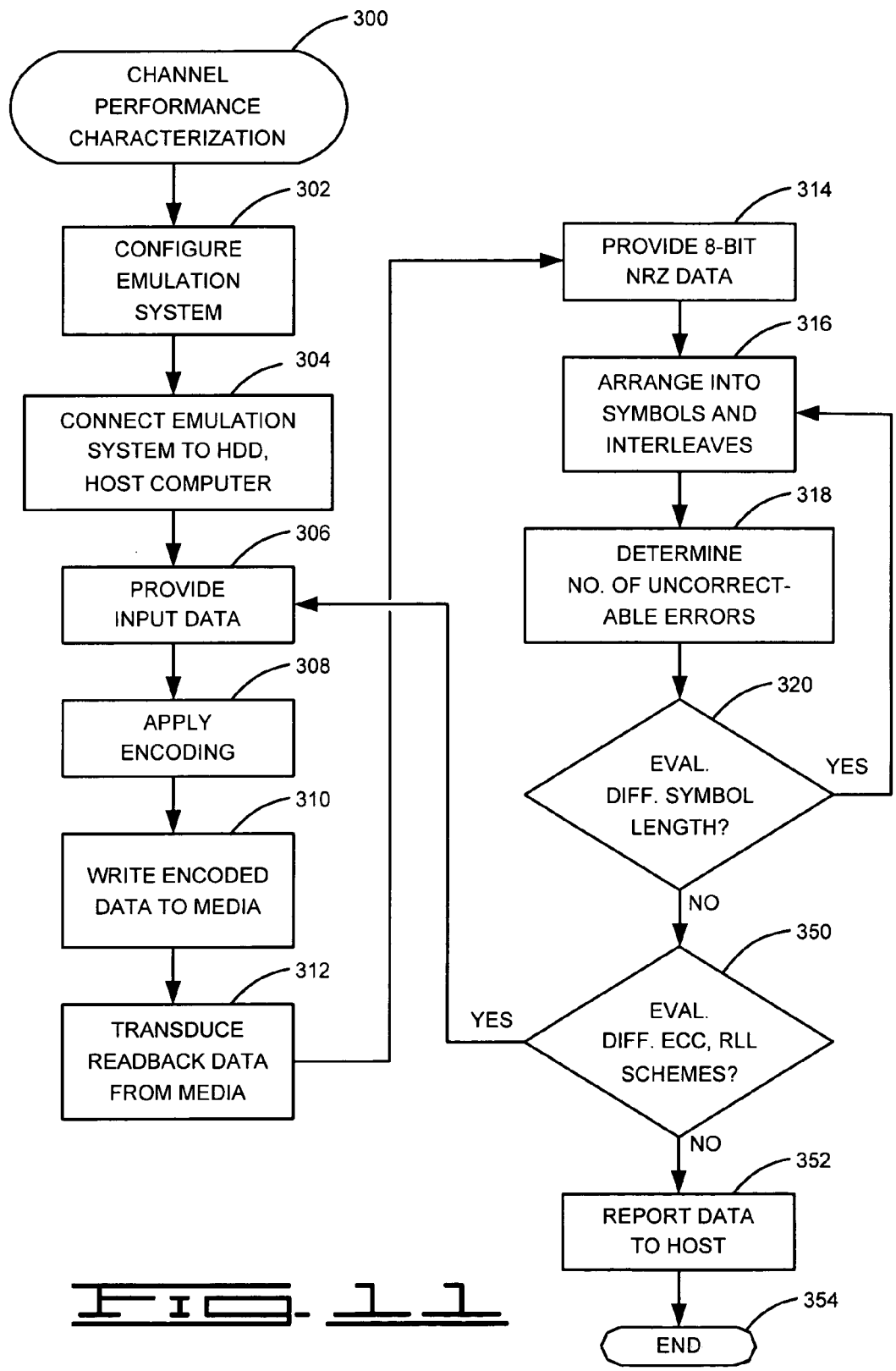
FIG. 11 is a flow chart for a CHANNEL PERFORMANCE CHARACTERIZATION routine, illustrative of steps carried out using a channel emulation system such as shown in FIGS. 8-10 to characterize the performance of a digital data channel such as shown in FIG. 10 in accordance with preferred embodiments of the present invention to use.

FIG. 11 provides a CHANNEL PERFORMANCE CHARACTERIZATION routine 300 to generally illustrate preferred operation of the system 200 as shown in FIG. 10. The emulation system 200 is initially configured as shown at step 302 to emulate one or more alternative encoding configurations.

To provide a concrete example, it will be assumed that the general system of FIGS. 3 and 5 is to be evaluated for different symbol lengths using a given RLL encoding scheme. Other variations will be discussed below.

The configuration of the system 200 during step 302 is preferably carried out using Very High Speed Integrated Circuit (VHSIC) Hardware Description Language (VHDL) to configure the FPGA 204. VHDL (standardized at IEEE 1076) is a high level Very Large Scale Integration (VLSI) design language with Ada-like syntax and currently is the U.S. Department of Defense (DoD) standard for hardware description. Alternatively, configuration software from the FPGA supplier can be used to configure the FPGA 204, as desired. Such steps are well within the ability of those skilled in the art and so further discussion will not be provided herein.

Once the desired FPGA configuration is created by a user of the host computer 202, the configuration data are either downloaded (such as via JTAG connector 216) to the system 200 or provided to the FPGA 204 by configuring and inserting the PROM 210. As shown by step 304, the configured system 200 is operably connected to the disc drive 100 and the host computer as shown in FIG. 10. The emulation system preferably disables the relevant operations of the disc drive circuitry (including the controller 240 and the RLL encoder 246) during this step. It will be noted that certain functions necessary to drive operation, such as servo circuit interface (used to position the heads 112), are not disabled.

It will be contemplated that the digital channel 230 of FIG. 10 is configured such that data supplied as an input to a selected disabled block (such as the RLL encoder 246) passes through the disabled block without effect or change in the data. In this way, the system 200 can use a single path (266) to introduce write data at various points in the write channel 234 and can use a single path (NRZ path 262) to obtain readback data from various points in the read channel 236.

At step 306, selected test input data are supplied by the host computer 202 to the disc drive 100. The input data are preferably stored in a first memory location of the RAM 206 during this step. The system proceeds in this example in step 308 to encode the input data with the selected RLL encoding (such as {fraction (8/9)}). No ECC encoding of the data (either before or after the RLL encoding) takes place in this example. At step 310, the RLL encoded data are written to the appropriate data sectors 122 on the discs 108 (media).

Once the encoded data are stored, the system 200 instructs the read channel 236 to transduce readback data from the media at step 312 and perform the necessary signal processing, including RLL decoding, to provide NRZ data on path 262. The data are provided to a second memory location of the RAM 206 during this step.

At step 316, the system 200 arranges the retrieved data into corresponding symbols and interleaves and determines the number of uncorrectable symbols during step 318. These steps are performed for each of a number of different symbol lengths in turn, as indicated by decision step 320.

Figure 12:
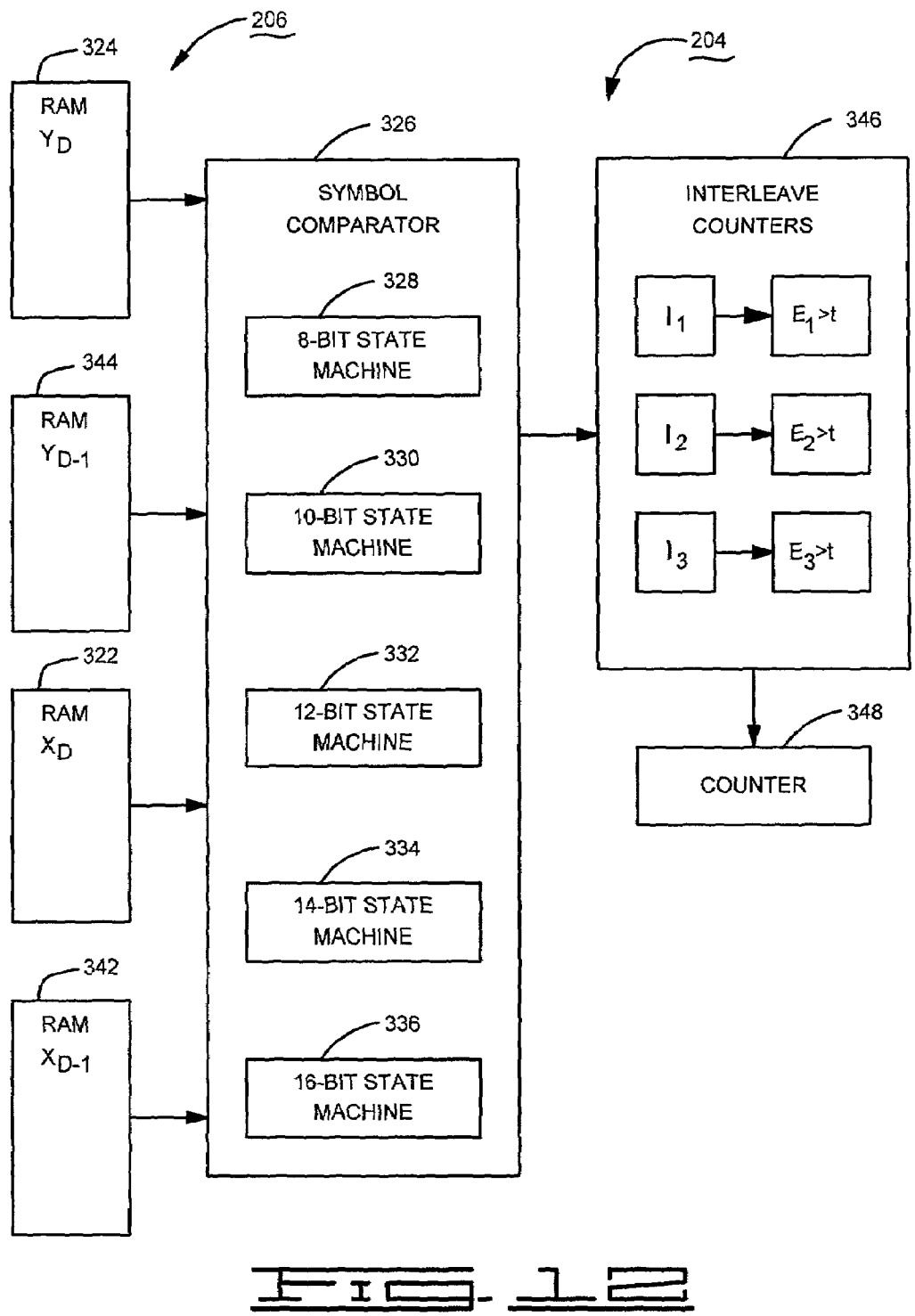
FIG. 12 is a functional block diagram of relevant portions of the field programmable gate array (FPGA) and random access memory (RAM) to illustrate a preferred manner in which particular steps of FIG. 11 are performed.

The manner in which the system preferably carries out these steps is illustrated by FIG. 12, which shows relevant portions of the FPGA 204 and RAM 206 of the system 200. While a number of memory management variations are envisioned, in one preferred embodiment RAM location $X_D$ 322 represents the first memory location into which the initial input data are stored at step 306, and RAM location $Y_D$ 324 represents the second memory location in which the 8-bit NRZ readback data are stored at step 314.

A symbol comparator network 326 of the FPGA 204 employs a number of state machines 328, 330, 332, 334 and 336 which are configured to selectively arrange the respective data sets into a number of different symbol lengths (in this case 8, 10, 12, 14 and 16 bits). During a first pass through steps 316, 318 and 320 of FIG. 11, the symbol comparator 326 uses a first selected state machine such as the 8-bit state machine 328 to arrange the original input data in $X_D$ memory location 322 into symbols in the desired, corresponding number of interleaves (in this case, three). The symbols and interleaves from the input data are stored in $X_{D-1}$ memory location 342. The state machine 328 repeats this operation upon the retrieved data in the $Y_D$ memory location 324 to provide arranged output data in the form of symbols and interleaves in $Y_{D-1}$ memory location 344.

An interleave counter circuit 346 compares the symbols of the input data in the $X_{D-1}$ memory location 342 to the symbols of the output data in the $Y_{D-1}$ memory location 344 on an interleave ($I_1$, $I_2$, $I_3$) basis and counts the number of erroneous symbols ($E_1$, $E_2$, $E_3$) in the output data as compared to the input data for each interleave. An erroneous symbol is defined as a symbol in the output data that has at least one bit that is different than the corresponding bit in the corresponding symbol in the input data, and would hence require correction by the ECC code words had such code words been generated.

Since the ECC scheme can detect and correct up to a selected threshold t of erroneous symbols in a data set, the interleave comparator 346 further preferably outputs values to a counter 348 which accumulates a total count $T_{ERR}$ of the number of erroneous data sets that exceed the threshold t of erroneous symbols. For example, if t=4, and the respective numbers of erroneous symbols $E_1$, $E_2$ and $E_3$ for the respective interleaves or data sets are 3, 7 and 6, then $T_{ERR}$ would equal 5 (i.e., $T_{ERR}$=0+3+2). ECC scheme will be able to correct the first data set related to $E_1$ but not the other two data sets. Data sets are determined by the symbol size and ECC methodology.

Once the $T_{ERR}$ value is determined for the first symbol length, the symbol comparator 326 repeats the above steps using a different state machine to reevaluate the data using a different symbol length (such as 10-bit symbols using state machine 330). In this way, the system 200 can quickly simulate the effects of each of a number of different symbol sizes on the same input and output data. This leads to a more accurate determination of the respective effects of different symbol lengths (and numbers of interleaves) since variations that might have otherwise been introduced by running different sets of data at different times is eliminated. Moreover, since the data manipulation steps performed by the circuit of FIG. 12 can take place very quickly, the time required to evaluate the various symbol sizes is significantly reduced since the data are only written and read once instead of multiple times.

Returning again to the flow of FIG. 11, once the evaluation of steps 316, 318 and 320 has been completed, the routine is shown to inquire at step 350 whether different encoding schemes are desired; if so, the routine returns to step 306 and the above steps are repeated. For example, instead of using 8/9 RLL encoding, it could be desired to now evaluate the effects of different symbol lengths and interleave arrangements using 16/17 or 20/21 RLL encoding. Referring again to FIG. 10, it will be noted that the system 200 can readily emulate both encoding and decoding functions of the RLL encoder 246 and the RLL decoder 260, allowing any number of encoding schemes to be evaluated in turn (even for channels not yet available from a supplier).

Step 352 of FIG. 11 shows that the error performance data obtained during the routine are transferred to the host computer 202 (preferably using the RS-232 interface via connector 218). The data can be reported as the data becomes available, or can be sent all at once at the conclusion of the system evaluation operations. The routine then ends at step 354.

The data obtained from the system 200 can be used in a number of ways to evaluate channel performance. One useful measure is referred to as corrected bit error rate, or CBER, which is preferably calculated using the following relation:

$$CBER = \frac{T_{ERR}}{B_{TOTAL}} \quad (2)$$

where $T_{ERR}$ represents the total number of uncorrectable data sets as discussed above and BTOTAL represents the total number of bits read. Preferably, the host computer 202 is used to generate the CBER values for each different configuration emulated by the system 200.

Generally, CBER is a measure of an expected error rate among corrected bits (i.e., with the operation of the EGG scheme) and is a better indicator of actual performance of a particular channel configuration as compared to RBER. CBER takes into account the performance of the EGG as it relates to the encoding scheme. Since CBER is an end to end recording system measurement, the disc drive designer can optimize the density gain of the recording medium for each specific product platform. It is not necessary to guess what the end performance will be as with the RBER. It will be noted that the CBER value can be determined in other ways (such as on an actual number of erroneous bits basis or on a per total symbols read basis), but such variations will be proportional to the value set forth by equation (2) and so the particular form is up to the preferences of a particular user.

Returning again to FIG. 10, it will be recognized that any number of different channel configurations can be emulated and evaluated by the system 200. For example, the embedded encoding scheme of FIGS. 6 and 7 discussed above can readily be implemented by the system 200 using suitable programming of the FPGA 202. To calculate CBER values for different ECC encoding schemes (including different symbol lengths and interleaves), the RLL encoded user data on path 152 (FIG. 6) can be stored in the first memory location (XD RAM location 322, FIG. 12) and, upon readback, the RLL encoded readback user data on path 166 (FIG. 7) can be stored in the second memory location (YD RAM location 324, FIG. 12). Thereafter, the FPGA 202 can operate as discussed above to calculate $T_{ERR}$ values for different symbol lengths.

For a given set of input data, the calculated CBER values for various combinations of encoding using widely different schemes (including the respective schemes of FIGS. 3 and 5 and of FIGS. 6 and 7) readily allow direct comparison of the effectiveness of these respective schemes in a fast and accurate manner. Although the discussion to this point has focused on obtaining a valid and accurate measure of channel configuration performance based on different ECC and RLL encoding schemes, it will be noted that other parametric variations can readily be employed. For example, the use of different Viterbi detector thresholds (or alternative detectors such as a decision feedback equalizer, DFE) can readily be emulated and evaluated.

More broadly, it will be noted that any digital processing function of the interface circuit 232, write channel 234 and read channel 236 can be emulated by the system 200. This allows schemes proposed by a channel manufacturer to be evaluated long before new generation components become available for evaluation. Also, a final channel configuration can be decided upon before costly investments are made to commit such schemes to silicon (i.e., fabricated components), allowing significant reductions in design cycles.

Finally, since in many cases all that is basically needed to select a final channel configuration for a particular product are the heads, media and preamp, channel evaluation can be performed as soon as heads and media become available. Thus, the system 200 can be used as a low cost, high powered alternative to a spin stand, the latter of which can cost several hundred thousand dollars from a spin stand supplier. The system 200 is accordingly well suited for use during manufacturing test operations as well as design operations.

In view of the foregoing, it will now be recognized that the present invention (as embodied herein and as claimed below) is generally directed to an apparatus and method for evaluating different digital data channel configurations.

In accordance with preferred embodiments, the apparatus comprises a digital data channel (such as 230) which stores input data to a recordable medium (such as by step 310) and subsequently retrieves readback data from the medium corresponding to the input data (such as by step 312).

An emulation circuit (such as 200) arranges the input data into an input sequence of multibit symbols each having a first selected symbol length and arranges the readback data into an output sequence of multibit symbols each having the first selected symbol length (such as by step 316). The emulation circuit determines a number of erroneous symbols in the output sequence in relation to differences between the input sequence and the output sequence (such as by step 318) to predict error rate performance of the digital data channel using a first error correction code (ECC) encoding methodology based on the first selected symbol length. The symbols in the input sequence and in the output sequence are preferably arranged into respective pluralities of interleaves (such as 126, 128 and 130).

The emulation circuit further preferably comprises a memory (such as 206) having a first memory location (such as 322) and a second memory location (such as 324). The input data are stored in the first memory location and the readback data are in the second memory location.

The emulation circuit preferably further comprises a field programmable gate array (FPGA, such as 204). The FPGA is preferably configured to include a symbol comparator circuit (such as 326) comprising a plurality of state machines (such as 328, 330, 332, 334, 336) each configured to arrange a selected set of data into a selected number of different symbol lengths including the first selected symbol length.

The FPGA further preferably comprises an interleave counter circuit (such as 346) which determines an uncorrectable number of erroneous symbols in each interleave that exceed a correctable number of erroneous symbols that can be corrected by the first ECC encoding methodology. The FPGA further preferably comprises a counter (such as 348) which accumulates the first number in relation to the respective uncorrectable numbers of data sets determined by the interleave counter circuit for each respective interleave.

The FPGA is further preferably configured to inhibit selected digital circuits of the digital data channel, such as a controller (such as 240), an RLL encoder (such as 246), an RLL decoder (such as 260) and a Viterbi detector (such as 258).

The method preferably comprises steps including using a digital data channel to store input data to a recordable medium (such as 108), said input data comprising an input stream of data bits (such as by step 310); subsequently using the digital data channel to obtain readback data from the recordable medium, said readback data comprising an output stream of data bits corresponding to the input stream of data bits (such as by step 312); arranging the input data into an input sequence of multibit symbols, each symbol having a first selected symbol length (such as by step 308); arranging the readback data into an output sequence of multibit symbols, each symbol having the first selected symbol length (such as by step 316); and comparing the output sequence with the input sequence to determine a first number of erroneous symbols in the output sequence (such as by step 318).

The method further preferably comprises predicting error rate performance of the digital data channel using a first error correction code (ECC) encoding methodology based on the first selected symbol length, said error rate performance predicted in relation to the first number (such as by step 352).

The comparing step preferably comprises determining the first number of erroneous symbols in the output sequence in relation to a selected number of erroneous symbols that can be detected by the first error correction code (ECC) encoding methodology.

The method further preferably comprises providing a memory (such as 206) having a first memory location (such as 322) and a second memory location (such as 324); storing the input data in the first memory location; and storing the readback data in the second memory location.

The method further preferably comprises additional steps of characterizing the input sequence and the output sequence as a first input sequence and a first output sequence (such as by step 320); further arranging the input data into a second input sequence of multibit symbols, each symbol having a second selected symbol length different from the first selected symbol length (such as by step 308); further arranging the readback data into a second output sequence of multibit symbols, each symbol having the second selected symbol length (such as by step 316); and comparing the second output sequence with the second input sequence to determine a second number of erroneous symbols in the second output sequence (such as by step 318).

In a preferred embodiment, the method further comprises performing run length limited (RLL) encoding upon the input data (such as by 246) prior to arrangement of the input data into the input sequence and storage of the input data upon the recordable medium (such as by step 310); and inhibiting RLL decoding of the readback data (such as by 260) so that the output sequence is formed of bits that nominally reflect said RLL encoding.

The method further preferably comprises arranging the multibit symbols of the input sequence into a plurality of interleaves (such as 126, 128, 130), and wherein the arranging the readback data step comprises arranging the multibit symbols of the output sequence into a corresponding plurality of interleaves (such as 126, 128, 130).

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the actuator assembly without departing from the spirit and scope of the present invention.

In addition, although the embodiments described herein are directed to an emulation system for a digital data channel of a disc drive, it will be appreciated by those skilled in the art that the system can be used for other types of devices without departing from the spirit and scope of the claimed invention, including other types of recording devices such as optical disc memory storage devices as well as other types of systems in which digital data are transmitted and received.

What is claimed is:

1. Method, comprising:
    using a digital data channel to store input data to a data storage medium;
    subsequently using the digital data channel to obtain output data from the medium;
    after storing the input data in the using step, arranging to input data into a selected digital configuration from a plurality of different selectable digital configurations;
    arranging the output data into the selected digital configuration; and
    comparing the output data arranged in the selected digital configuration with the input data arranged in the selected digital configuration to determine an error rate performance.

2. The method of claim 1 wherein the comparing step is characterized by using a first error correction code (ECC) encoding methodology based on the selected digital configuration.

3. The method of claim 2, wherein the comparing step is characterized by determining a number of errors in the output data in relation to a selected number of errors that can be detected by the first error correction code (ECC) encoding methodology.

4. The method of claim 1, wherein the arranging the input and output data steps are characterized by sequences of multibit symbols each having a selected symbol length.

5. The method of claim 4 wherein the comparing step is characterized by predicting the error rate in relation to differences between the input sequence and the output sequence.

6. The method of claim 4 wherein the arranging the input and output data steps are characterized by sequences of multibit symbols each having a second selected symbol length.

7. The method of claim 6 wherein the comparing step is characterized by predicting error rate performance using a second error correction code (ECC) encoding methodology based on the second selected symbol length.

8. The method of claim 1 wherein the ranging the input and output data steps are characterized by performing run length limited (RLL) encoding upon the input data and inhibiting RLL decoding of the output data to reflect said RLL encoding.

9. The method of claim 1, wherein the arranging the input and output data steps are characterized by arranging the data into a plurality of interleaves.

10. The method of claim 1 comprising concurrently inhibiting and emulating selected operation of the digital data channel.

11. The method of claim 1 wherein the comparing step is characterized by predicting the error rate in relation to only one selected digital configuration of the input and output data.

12. The method of claim 1 wherein the comparing step is characterized by predicting the error rate in relation to two or more selected digital configurations of the input and output data.

* * * * *